(12) United States Patent
Humphrey et al.

(10) Patent No.: US 8,281,172 B2
(45) Date of Patent: Oct. 2, 2012

(54) SERVER WITH MULTIPLE POWER SUPPLIES TRANSITIONING FIRST POWER SUPPLY FROM ITS ONLINE STATE TO ITS STANDBY STATE AND SECOND POWER SUPPLY TO ITS DEEP-SLEEP STATE

(75) Inventors: Daniel Humphrey, Houston, TX (US); Mohamed Amin Bemat, Cypress, TX (US); Reynaldo P. Domingo, Spring, TX (US); David Paul Mohr, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 12/432,905

(22) Filed: Apr. 30, 2009

(65) Prior Publication Data
US 2010/0281281 A1 Nov. 4, 2010

(51) Int. Cl.
*G06F 1/00* (2006.01)
*G06F 1/32* (2006.01)
(52) U.S. Cl. .......................... 713/323; 713/300; 713/320
(58) Field of Classification Search ................... 713/323
See application file for complete search history.

(56) References Cited

U.S. PATENT DOCUMENTS

| 5,542,035 | A  | * | 7/1996  | Kikinis et al.  | 713/323 |
| 5,894,415 | A  | * | 4/1999  | Habegger        | 363/65  |
| 7,574,505 | B2 | * | 8/2009  | Park et al.     | 709/224 |
| 8,020,016 | B2 | * | 9/2011  | Hatasaki et al. | 713/323 |
| 8,032,771 | B2 | * | 10/2011 | Rangeley        | 713/320 |
| 8,078,894 | B1 | * | 12/2011 | Ogami           | 713/321 |

* cited by examiner

*Primary Examiner* — Suresh Suryawanshi

(57) ABSTRACT

One exemplary embodiment is a server that includes multiple power supplies. When the server is in a standby state, one power supply is in a standby state and another power supply is in a deep sleep state.

20 Claims, 2 Drawing Sheets

SERVER WITH MULTIPLE POWER SUPPLIES TRANSITIONING FIRST POWER SUPPLY FROM ITS ONLINE STATE TO ITS STANDBY STATE AND SECOND POWER SUPPLY TO ITS DEEP-SLEEP STATE

BACKGROUND

When a server enters a standby mode, electronic components in the server still draw power. A power supply is an example of one such component.

Current power supply designs operate all power supplies in a standby state while the server is in a standby state. Each power supply consumes a constant amount of power to be functional in addition to power conversion losses associated with the standby load.

If a server has multiple power supplies, then each of these power supplies continues to draw power and increase the costs associated with running the server even while the server is in a sleep or standby mode. Such costs accrue over time and can be substantial, especially in a data center that houses hundreds or thousands of servers.

DETAILED DESCRIPTION

Figure 1:
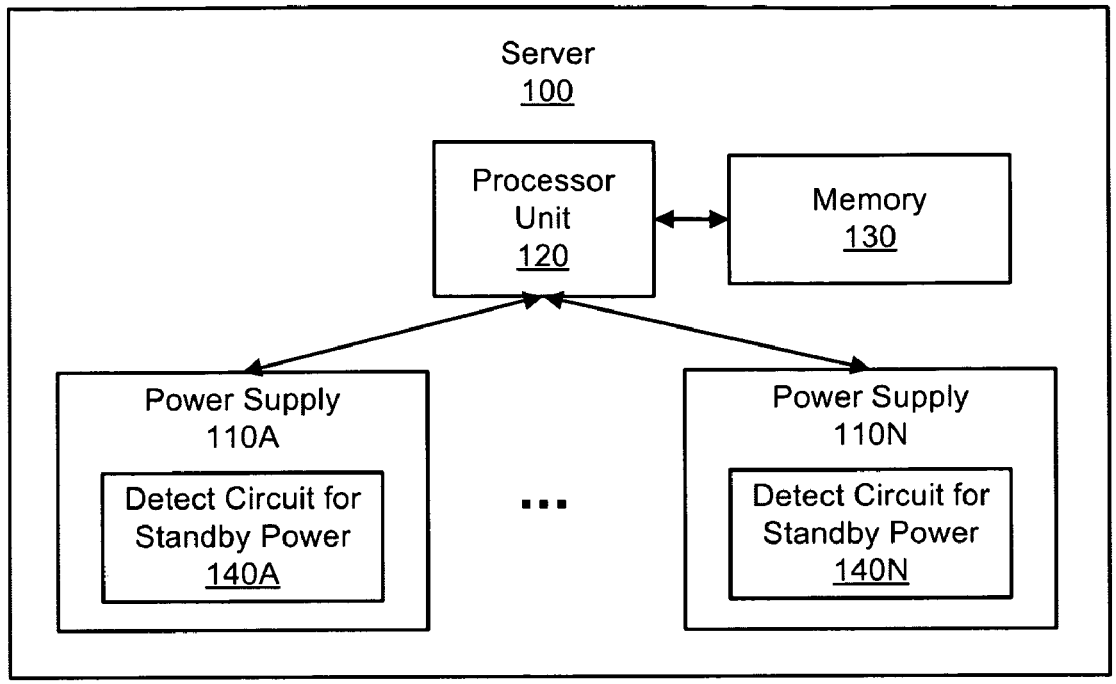
FIG. 1 is a high level block diagram of a server that includes multiple power supplies according to one exemplary embodiment.

Exemplary embodiments are directed to apparatus, systems, and method that place superfluous power supplies in a server into a minimal power consumption state while the server is in a standby state. Unnecessary power supplies in a server are placed into a less power consuming state to minimize input power consumption while a server is in standby.

In a server with multiple power supplies, power consumption is significantly reduced while the server is in the standby state since standby power is supplied to the server from a single power supply. When more than one power supply exists in a server, multiple power supplies are not necessary to supply requisite standby power to the server. The server can operate with the standby output power from only a single power supply.

Each power supply consumes a constant amount of power to be functional in addition to power conversion losses associated with the standby load. Any power consumed by more than one power supply is unnecessary or superfluous when the server is in standby. In exemplary embodiments, servers operate in standby with output load capabilities from a single power supply. Exemplary embodiments thus recoup or save power previously wasted when servers operated in standby with more than one power supply.

Servers have multiple modes or states of operation. For example, a server has two general modes of operation that include an online state and a power saving state (such as sleep, standby, or hibernate).

Power supplies also have multiple modes or states of operation. For example, a power supply has three modes of operation that include an online state, a standby state, and a deep sleep state. The online state occurs when input power is connected, and the power supply is capable of providing full rated output power. The standby state occurs when the input power is connected, and the power supply is capable of providing full rated standby power. The deep sleep state occurs when all power converters in the power supply are disabled (for example, a main converter, a standby converter, and an input converter are disabled).

The deep sleep state provides significant power savings since all power converters are disabled in the power supply. This state occurs when as many of the unutilized overhead internal loads in the power supply are disabled. Exemplary unutilized power consuming components include, but are not limited to, in-rush circuitry, main power train protection circuitry, and main power train controllers. Further, any subset of the overhead loads can be disabled to enable partial power savings.

Exemplary embodiments provide methods and apparatus that transition the power supplies in a server between these different modes of operation to conserver power. The power supplies transition from the deep sleep or standby states to the online state, and transition from the online state to the deep sleep or standby states. Control or management of these transitions occurs from the server housing the power supplies, one or more of the power supplies themselves, configuration settings input from a user, and/or fault conditions detected during operation of the server.

As one example, the server is designated to manage or control when each of its power supplies remains in the online, standby, or deep sleep states. For instance, if a server has four power supplies, the server communicates to three of these power supplies to enter standby mode when the server enters standby mode.

As another example, when a fault condition occurs (such a voltage rail decrease or loss of input power from a standby power supply), one or more of the power supplies automatically transition from the deep sleep or standby state.

One exemplary embodiment places all unnecessary power supplies into a minimal power consumption state (i.e., standby or deep sleep states) to minimize input power consumption while a server is in standby. In one exemplary embodiment, this minimal power consumption state reduces power supply consumption in standby up to ninety-five percent (95%). By way of example, the standby input power is cut by more than forty-five percent (45%) with two power supplies in parallel. Power savings will further increase as the number of power supplies in the server increases. Standby input varies depending on loading conditions and input line conditions. Reduction in standby input power of 45% is seen at very light standby loads, and it decreases as the load gets higher. This decrease occurs because overhead power becomes a smaller percentage of the total power as the power increases.

In an exemplary embodiment, power consumed by a power supply in the deep sleep state is less than power consumed by a power supply in the standby state. Thus, the deep sleep state provides greater power savings over both the standby and online states. Both the deep sleep and standby states provide significant power savings over the online state.

FIG. 1 is a high level block diagram of a server 100 that includes multiple power supplies 110A to 110N, a processing unit 120, a memory 130, and a detect circuit for standby power 140A to 140N in each power supply. In one embodiment, the processor unit 120 includes a processor (such as a central processing unit, CPU, microprocessor, application-specific integrated circuit (ASIC), etc.) for controlling the overall operation of memory 130 (such as random access memory (RAM) for temporary data storage, read only memory (ROM) for permanent data storage, and firmware). The memory 130, for example, stores applications, data, programs, algorithms (including software to implement or assist in implementing embodiments in accordance with the present invention) and other data.

Figure 2:
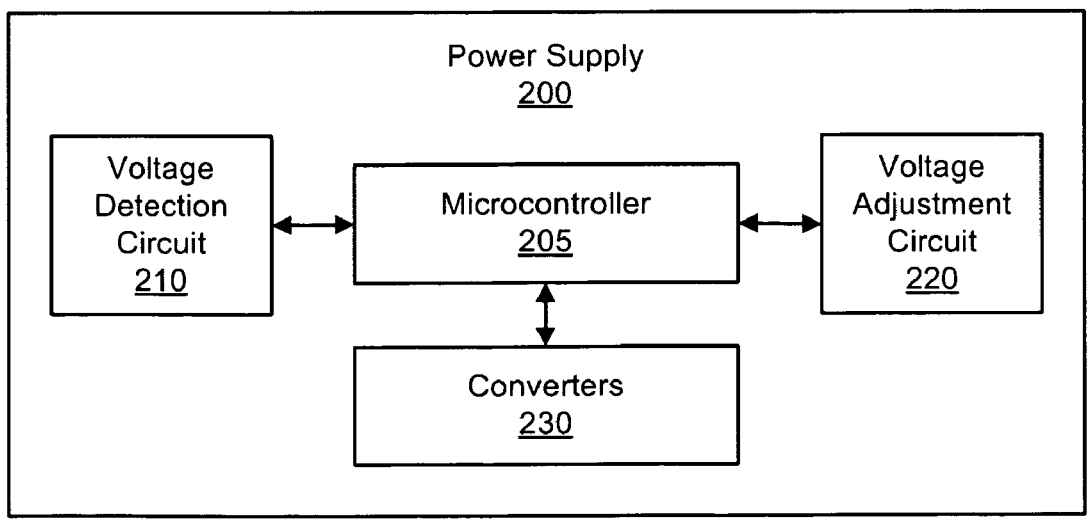
FIG. 2 is a high level block diagram of a power supply that includes a voltage detection circuit and a voltage adjustment circuit according to one exemplary embodiment.

FIG. 2 is a high level block diagram of a power supply 200 that includes a microcontroller 205 that connects to a voltage detection circuit 210, a voltage adjustment circuit 220, and converters 230 (such as one or more of a main converter, a standby converter, and an input converter). The voltage detection and adjustment circuits are shown in more detail in FIGS. 3A and 3B.

The microcontroller 205 in conjunction with the voltage detection circuit 210 and a voltage adjustment circuit 220 in power supply 200 perform one or more of the following functions:

(1) Place the power supply into the deep sleep mode.
(2) Maintain the power supply in the deep sleep mode.
(3) Detect when the power supply can safely be placed from an online or standby mode into the deep sleep mode.
(4) Bring the power supply out of deep sleep mode into the standby or online modes.

The power supply components that fulfill these functions are powered by standby output power of a power supply not in deep sleep mode (i.e., another power supply that is in either standby or online modes). This standby output power is relatively insignificant when compared to the standby rating of a power supply.

Figure 3A:
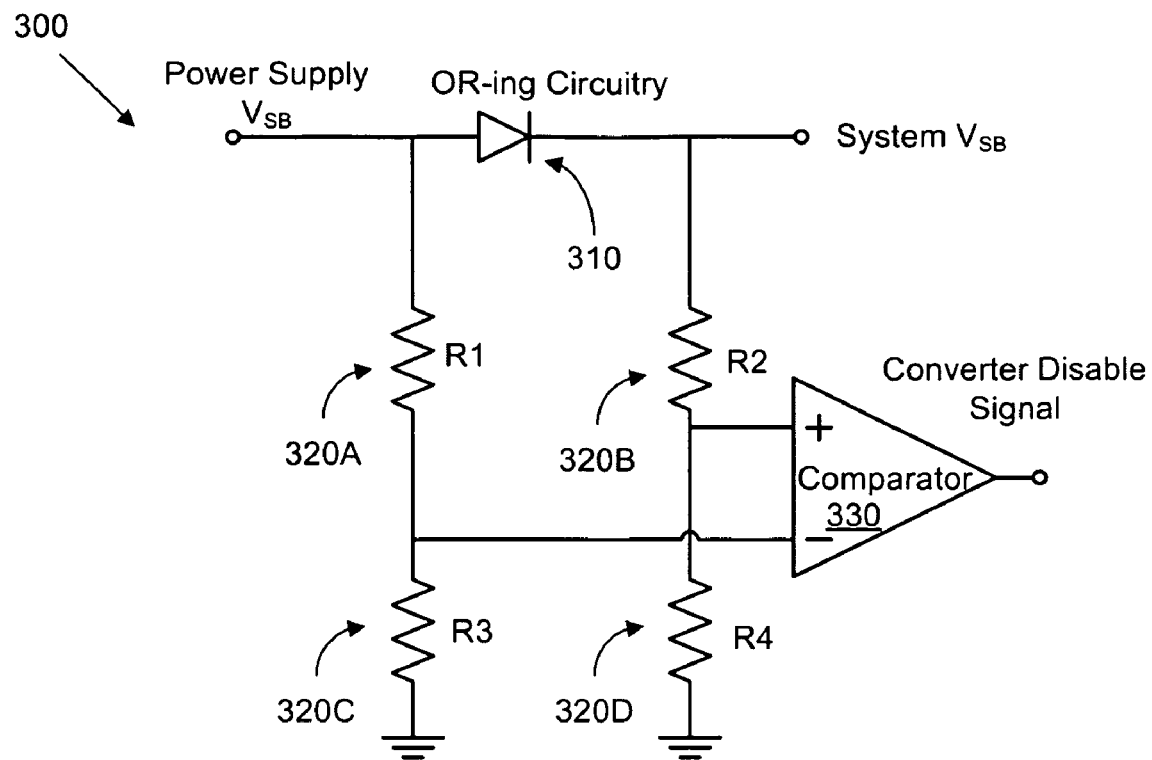
FIG. 3A is a schematic diagram of a voltage detection circuit that detects a higher output voltage at a standby output according to one exemplary embodiment.
Figure 3B:
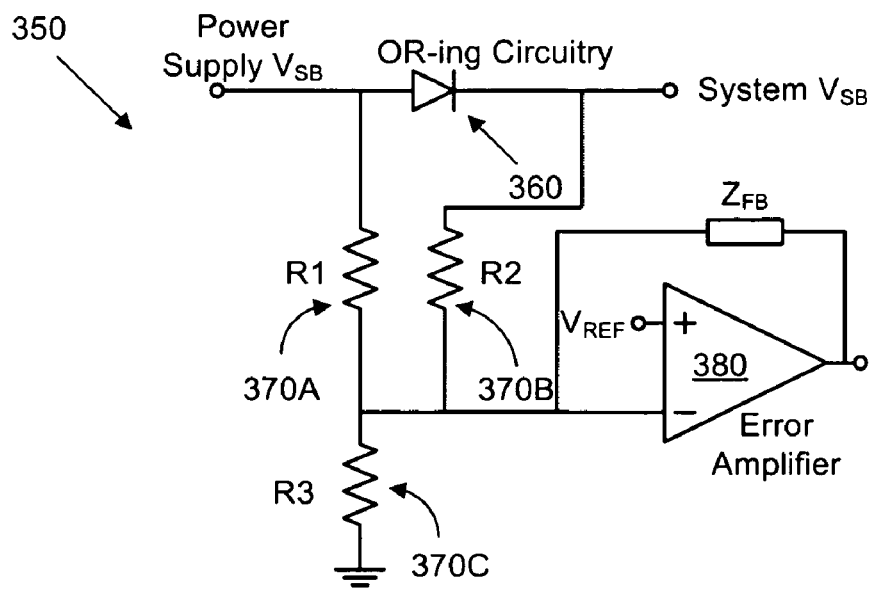
FIG. 3B is a schematic diagram of a voltage adjustment circuit that adjusts standby voltage feedback according to one exemplary embodiment.

Exemplary embodiments include different methods and apparatus to implement these functions. The circuits in FIGS. 3A and 3B show a first embodiment. A second exemplary embodiment occurs when the server communicates to all extra power supplies to enter a standby or deep sleep state. This communication can occur, for example, through a signal or communication bus. When a fault is detected, the server signals these extra power supplies to transition to an online state. The power supply and/or the server can detect the fault.

The first embodiment detects when a standby output voltage is higher than an internal standby output voltage of the power supply. This detection is performed by a comparator circuit across OR-ing circuitry for the standby output. FIG. 3A shows a high level schematic diagram of a circuit that performs this detection.

In addition to detecting this voltage difference, the voltage feedback to the standby controller error amplifier is affected by both voltages across the OR-ing circuitry. FIG. 3B shows a high level schematic diagram of a circuit to detect such a response.

As discussed more fully below in connection with FIG. 3B, a dual feedback error amplifier is implemented such that the internal power supply standby voltage is regulated lower when the system standby voltage is higher. This regulating effect causes a comparator circuit (shown in FIG. 3A) to detect a negative potential across the OR-ing circuitry which, in turn, signals to the power supply that it is safe to disable all converters.

FIG. 3A is a schematic diagram of a voltage detection circuit 300 that detects a higher output voltage at the system standby output according to one exemplary embodiment. The circuit includes an OR-ing circuit 310, plural resistors (R1 at 320A, R2 at 320B, R3 at 320C, and R4 at 320D), and a comparator 330.

Comparator 330 and plural resistors (R1 at 320A, R2 at 320B, R3 at 320C, and R4 at 320D) are designed such that when the System $V_{SB}$ is greater in voltage than the Power Supply $V_{SB}$ that it will output at a logic level corresponding to higher System $V_{SB}$. This condition indicates to the power supply that it is not supplying power to the system. This logic condition signals to all converters on the output side to shut off as well as disable all converters on the input side of the power supply by holding in a disable state.

Indicating the opposite condition, Power Supply $V_{SB}$ higher than System $V_{SB}$ comparator 330 indicates to the power supply that it is providing power to the system.

FIG. 3B is a schematic diagram of a voltage adjustment circuit 350 that adjusts standby voltage feedback according to one exemplary embodiment. The circuit includes an OR-ing circuit 360, plural resistors (R1 at 370A, R2 at 370B, and R3 at 370C), and an error amplifier 380.

Error amplifier 380 controls the standby output converter and works in conjunction with the circuit in FIG. 3A. Plural resistors (R1 at 370A, R2 at 370B, and R3 at 370C) are designed such that if the System $V_{SB}$ is greater in voltage that Power Supply $V_{SB}$ the error amplifier will lower the Power Supply $V_{SB}$ further to enhance the circuit in FIG. 3A's ability to determine that the power supply is not providing power. Thus, amplifier lowers an output voltage of a power supply not providing power to the server and increases an output voltage of a power supply providing power to the server.

Likewise, if the Power Supply $V_{SB}$ is greater in voltage than the System $V_{SB}$, the error amplifier will slightly increase the Power Supply $V_{SB}$ to enhance the circuit in FIG. 3A's ability to determine that the power supply is providing power.

DEFINITIONS

As used herein and the claims, the following terms are defined as follows:

The term "deep sleep state" or "deep sleep mode" occurs when all power converters in a power supply are disabled (for example, a main converter, a standby converter, and an input converter are disabled).

The term "online state" or "online mode" occurs when input power is connected, and a power supply is capable of providing full rated output power.

The term "power supply" is an electronic device that converts alternating current (AC) power to a low voltage direct current (DC) power that is usable by a computer. The term power supply also includes DC to DC converters.

The term "standby state" or "standby mode" occurs when input power is connected, and a power supply is capable of providing full rated standby power while the main output or outputs are not capable of providing power.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A server comprising plural power supplies, each of said power supplies having an online state, a standby state, and a deep-sleep state, said power supplies being configured so that, when the server transitions from an online state to a standby state, at least a first power supply transitions from its online state to its standby state and at least a second power supply transitions from its online state to its deep-sleep state.

2. The server of claim 1 further comprising, a detection circuit in the server including an operational amplifier that:
   lowers an output voltage of a power supply not providing power to the server, and
   increases an output voltage of a power supply providing power to the server.

3. The server of claim 1 wherein each of the power supplies includes a comparator circuit and an OR-ing circuit that detect when a standby output voltage of the server is higher than a standby output voltage of the first and second power supplies and provides an indication for the server to enter the deep sleep state.

4. The server of claim 1 wherein each of the first and second power supplies includes plural power converters and a detection circuit that includes an error amplifier and a comparator circuit, the detection circuit being configured to generate a signal that indicates when to disable the plural power converters.

5. The server of claim 1 wherein each of the first and second power supplies includes a main converter, a standby converter, and an input converter that are all disabled in the deep sleep mode.

6. The server of claim 1 further comprising:
   a first circuit in the first power supply that controls when the first power supply transitions between the online state and the standby state;
   a second circuit in the second power supply that controls when the second power supply transitions between the online state and the deep sleep state.

7. The server of claim 1, wherein the server, while in the standby state, receives and operates from standby output power from only the first power supply while all power converters in the second power supply are disabled in the deep sleep state, said second power supply receiving power from said first power supply while said server is in standby state.

8. The server of claim 1, wherein:
   the deep sleep state for the second power supply occurs when all power converters in the second power supply are disabled;
   the online state in the first and second power supplies occurs when input power is connected and the first and second power supplies are capable of providing full rated output power.

9. A method that executes in a server computer that includes plural power supplies, each of said power supplies having a respective online state, a respective standby state, and a respective deep-sleep state, the method comprising:
   transitioning the server computer from an online state to a standby state;
   in response to transitioning the server computer to the standby state, transitioning a first power supply to a standby state; and
   in response to transitioning the server computer to the standby state, transitioning all of the plural power supplies, except the first power supply, to a deep sleep state, wherein a power supply in the deep sleep state consumes less power than a power supply in the standby state.

10. The method of claim 9 further comprising disabling all power converters in power supplies that transition to the deep sleep state, wherein at least one power supply in its deep sleep state while said server is in said standby state receives power from a power supply in its standby state.

11. The method of claim 9 further comprising, providing all power to the server in the standby state from the first power supply in the standby state.

12. The method of claim 9 further comprising,
   generating, by the server, a signal that instructs the first power supply when to transition from an online state to the standby state;
   generating, by the server, a signal that instructs all of the plural power supplies, except the first power supply, to transition from an online state to the deep sleep state.

13. The method of claim 9 further comprising, generating, by a circuit in each of the plural power supplies, a signal that instructs when the plural power supplies transition from an online state to the standby state or the deep sleep state.

14. The method of claim 9 further comprising, generating, by a circuit in the first power supply, a signal that instructs the first power supply when to transition from an online state to the standby state.

15. The method of claim 9 further comprising, detecting, by a circuit in each of the plural power supplies, whether the plural power supplies can safely transition to the deep sleep state.

16. A tangible computer readable medium having instructions for causing a computer to execute a method, comprising:

maintaining a first power supply in a server in a standby state while the server is in a standby state, said first power supply having an online state, a standby state, and a deep-sleep state;

supplying power from the first power supply in the standby state to the server in the standby state; and maintaining plural power supplies in the server in a deep sleep state while the server is in the standby state, each of said plural power supplies having a respective online state, a respective standby state, and a respective deep-sleep state.

17. The tangible computer readable medium of claim 16 further comprising, detecting with circuitry in the first power supply when the server enters the standby state, said first power supply in its standby state supplying power to at least one power supply in its deep-sleep state while said server is in its standby state.

18. The tangible computer readable medium of claim 16 further comprising, transitioning a second power supply from the deep sleep state to an online state upon detecting a fault condition in the first power supply.

19. The tangible computer readable medium of claim 16 further comprising, maintaining the plural power supplies in the deep sleep state to conserve power while the server is in the standby state, wherein a power supply in the deep sleep state consumes less power than a power supply in the standby state.

20. The tangible computer readable medium of claim 16 further comprising, disabling in-rush circuitry, main power train protection circuitry, and main power train controllers in the plural power supplies in the deep sleep state.

* * * * *